United States Patent [19]

Iida

[11] Patent Number: 4,573,084
[45] Date of Patent: Feb. 25, 1986

[54] DOCUMENT INFORMATION FILING SYSTEM

[75] Inventor: Kazuhiko Iida, Yokohama, Japan

[73] Assignee: Tokyo Shibaura Denki Kabushiki Kaisha, Kawasaki, Japan

[21] Appl. No.: 563,268

[22] Filed: Dec. 20, 1983

Related U.S. Application Data

[63] Continuation of Ser. No. 255,633, Apr. 20, 1981.

[30] Foreign Application Priority Data

Apr. 21, 1980 [JP] Japan .................. 55-52563

[51] Int. Cl.⁴ ............................................. H04N 1/30
[52] U.S. Cl. ................... 358/300; 360/72.2; 360/35.1; 369/30; 369/32; 358/296
[58] Field of Search ........... 360/72.2, 9.1, 35.1; 369/30, 32, 33; 358/296, 133, 300, 348

[56] References Cited

U.S. PATENT DOCUMENTS

| | | | |
|---|---|---|---|
| 3,051,777 | 8/1962 | Lemelson | 360/35.1 |
| 4,183,065 | 1/1980 | Rhody | 360/9.1 |
| 4,302,782 | 11/1981 | Gunning | 358/296 |
| 4,321,635 | 3/1982 | Tsuyuguchi | 369/32 |
| 4,338,644 | 7/1982 | Staar | 360/72.2 |
| 4,357,638 | 11/1982 | Yashimaru | 360/72.2 |

FOREIGN PATENT DOCUMENTS

| | | | |
|---|---|---|---|
| 28096 | 8/1973 | Japan | 360/33.1 |
| 47970 | 12/1974 | Japan | 360/33.1 |

*Primary Examiner*—Alan Faber
*Attorney, Agent, or Firm*—Cushman, Darby & Cushman

[57] ABSTRACT

All index information recorded on a magnetic cassette tape detachably mounted on a document information filing system and corresponding severally to a plurality of image information are stored in a RAM in a control section. The RAM is quickly searched for an index information corresponding to a desired image information, a magnetic head is set to a track position and a block position designated by the detected index information, an image information is read out from the designated position, and the read image information is formed into a hard copy by a printing device.

8 Claims, 6 Drawing Figures

DOCUMENT INFORMATION FILING SYSTEM

This is a continuation, of application Ser. No. 255,633, filed Apr. 20, 1981.

BACKGROUND OF THE INVENTION

This invention relates to a document information filing system capable of optically reading image information such as from original documents, storing the document information, and optionally retrieving and displaying or printing out the stored document information.

Recently there have been developed document information filing systems in which a plurality of image information including documents are read by two-dimensional optical scanning apparatus, stored in a large-capacity image information memory device such as a video tape recorder, and optionally retrieved for display and or printing in hard copy.

In such document information filing system, an endless magnetic cassette tape having multiple tracks is set in the video tape recorder for use as the image information memory device, the magnetic cassette tape is driven at a high speed, and a magnetic head is moved in a direction at right angles to the running direction of the tape to select a desired magnetic track of the tape. Image information are recorded on the selected magnetic track for each page of original documents being stored, or previously recorded image information are read out from the magnetic track. At least one of a number of magnetic tracks of the magnetic tape is used as an index magnetic track on which a specific index information corresponding to an image information is recorded when such image information is recorded on a magnetic track for image information recording. The index information is used for referring to a desired image information among a great number of recording image information. In such reference, according to a known information filing system, an index information is first retrieved, and then the desired image information is searched for in accordance with the detected index information. According to such a known method, however, the index information cannot sometimes be decoded since the tape runs at a high speed. Namely, the running speed of the tape is higher than the index information decoding speed, so that the tape may proceed to the next index information while an index information is being decoded, thereby prohibiting the preceding index information from being decoded.

With the prior art document information filing system, moreover, the magnetic tape is searched for an index information with recording of every image information, so that it takes a lot of time to read out a number of image information.

SUMMARY OF THE INVENTION

It is therefore an object of this invention to provide a document information filing system capable of securely decoding index information and quickly reading out image information.

According to this invention, there is provided a document information filing system in which all index information recorded on a magnetic tape are first stored in a high speed memory separate from the magnetic tape, and the high speed memory is quickly searched for desired index information.

DETAILED DESCRIPTION OF THE PREFERRED EMBODIMENT

Figure 1:
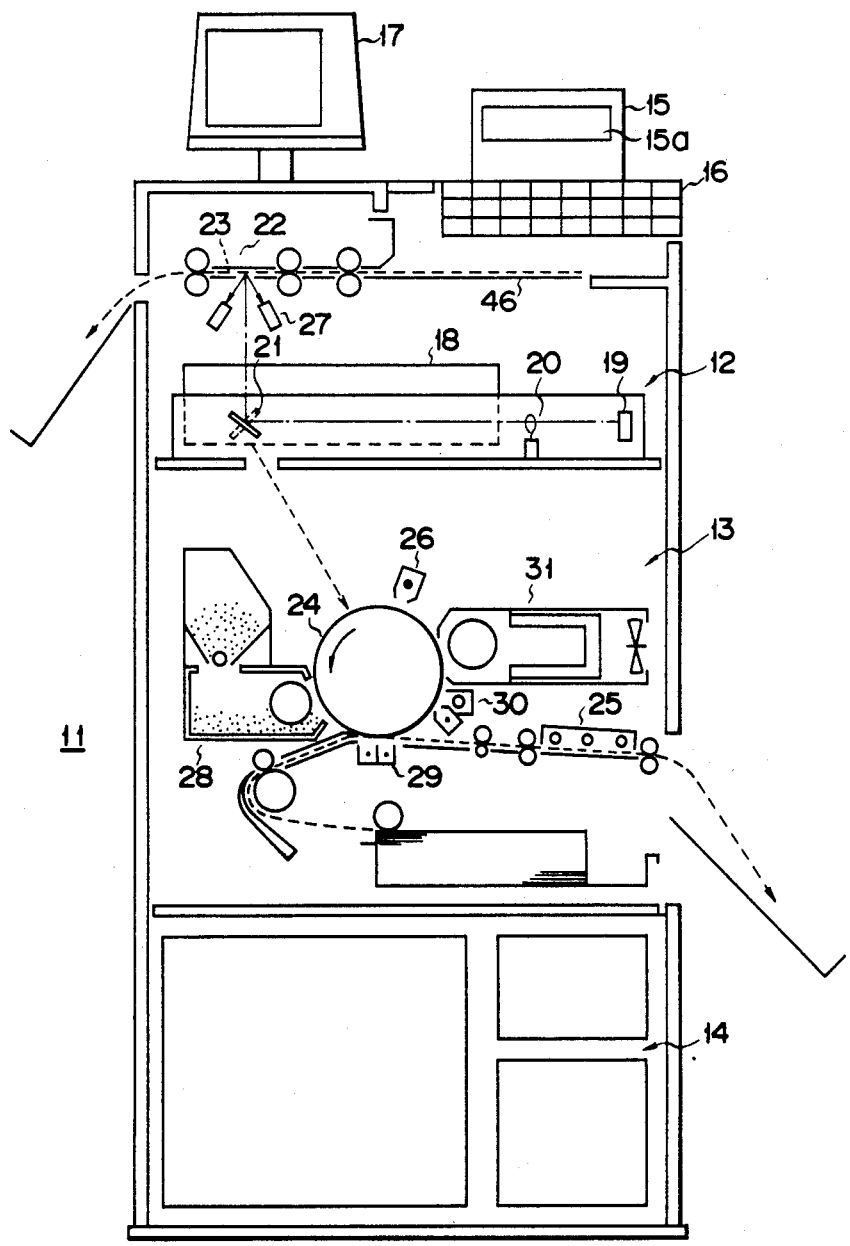
FIG. 1 is a schematic view of a document information filing system according to an embodiment of this invention.

Referring now to the drawing of FIG. 1, there is shown a document information filing system 11 which comprises a scanner section 12, a printing device 13, and a control section 14. Disposed on the top of the document information filing system 11 are a longitudinal video recorder (LVR) 15, a keyboard 16, and a display device 17. The scanner section 12 is provided with a laser oscillator 18, a mirror 19, an optical scanner 20, and a flip mirror 21. When directed toward a document 23 transferred by a document transfer 22, the flip mirror 21 leads a laser beam to the document 23. The printing device 13 is provided with a photoconductive drum 24 around which a charger 26, a developer 28, a transfer charger 29, an erasing charger and exposure unit 30, and a cleaning unit 31 are arranged along the rotating direction of the drum 24.

Figure 2:
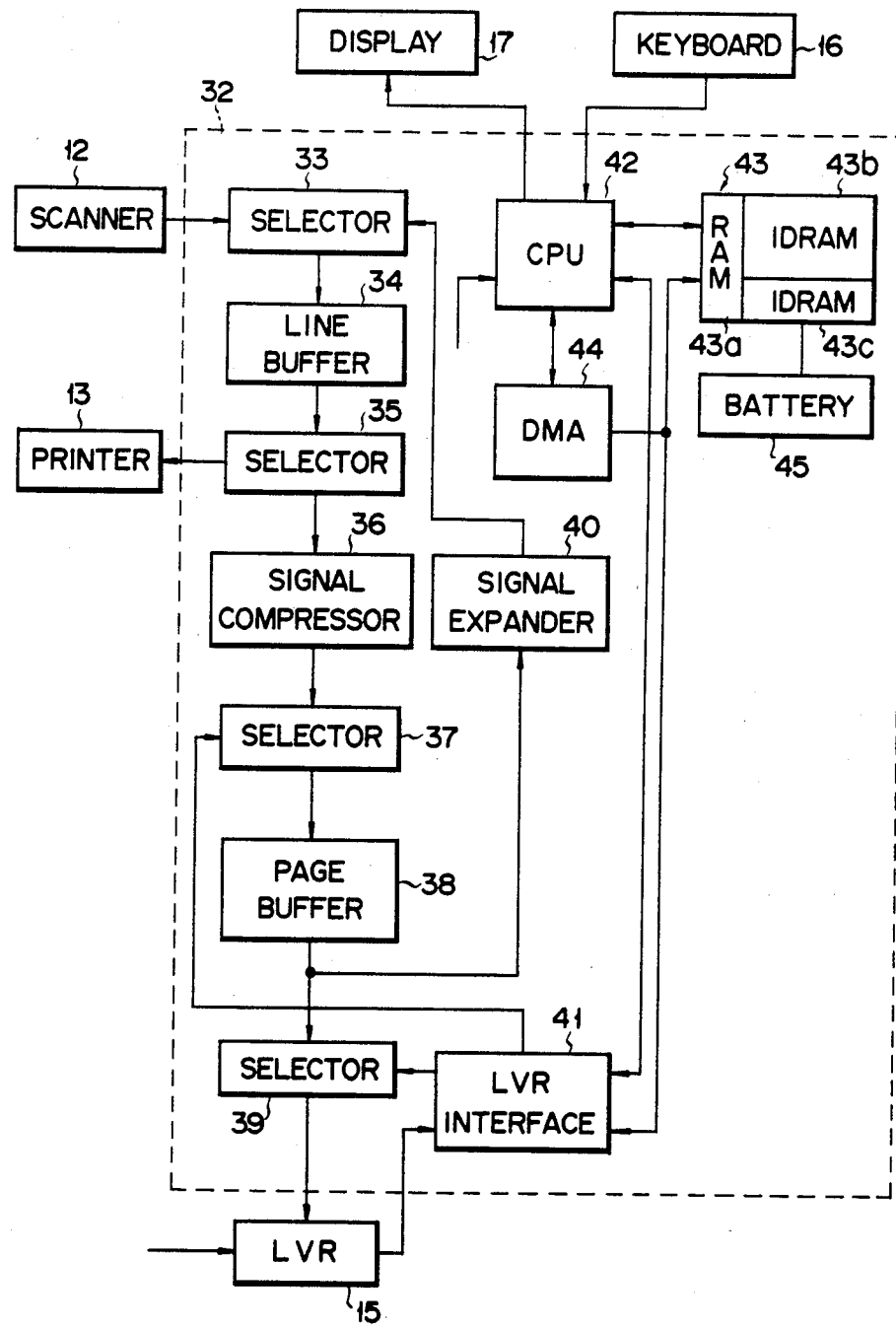
FIG. 2 shows details of a control section of the document information filing system of FIG. 1.

FIG. 2 shows a schematic block circuit of the document information filing system 11 of FIG. 1. In this block circuit, the scanner 12 and the keyboard 16 are connected to a control section 32. The control section 32 is connected to the printing device 13, an LVR 15, and the display unit 17. In the control section 32, there is provided a selector 33 which has a first input terminal connected with the output terminal of the scanner 12. The output terminal of the selector 33 is connected to the input terminal of a line buffer 34. The output terminal of the line buffer 34 is connected to the input terminal of a selector 35, while first and second output terminals of the selector 35 are connected to the input terminals of the printing device 13 and an information compressor 36, respectively. The output terminal of the information compressor 36 is connected to a first input terminal of a selector 37 the output terminal of which is connected to the input terminal of a page buffer 38. The output terminal of the page buffer 38 is connected to a first input terminal of a selector 39, and also connected to a second input terminal of the selector 33 through an information expander 40. The output terminal of the selector 39 is connected to the input terminal of the LVR 15 the output terminal of which is connected to the input terminal of an LVR interface 41. First and second output terminals of the LVR interface 41 are connected to a second input terminal of the selector 37 and a second input terminal of the selector 39, respectively. Further, a first input-output terminal of the LVR interface 41 is connected with a CPU (e.g., INTEL microprocessor 8085) 42, while a second input-output terminal of the LVR interface 41 is connected with both a RAM section 43 and a DMA (e.g., INTEL DMA 8257) 44. The RAM section 43 includes a programming RAM 43a, an ID RAM (e.g., INTEL RAM 2117) 43b, and a nonvolatile ID RAM (e.g., CMOS memory) 43c.

The ID RAM 43c is always supplied with electric power from a back-up battery 45. The RAM 43a stores the operation program of the document information filing system 11.

Figure 3:
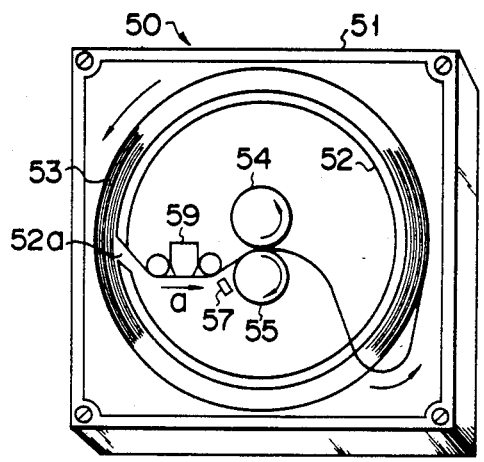
FIG. 3 is a perspective view of an endless magnetic cassette tape.
Figure 4:
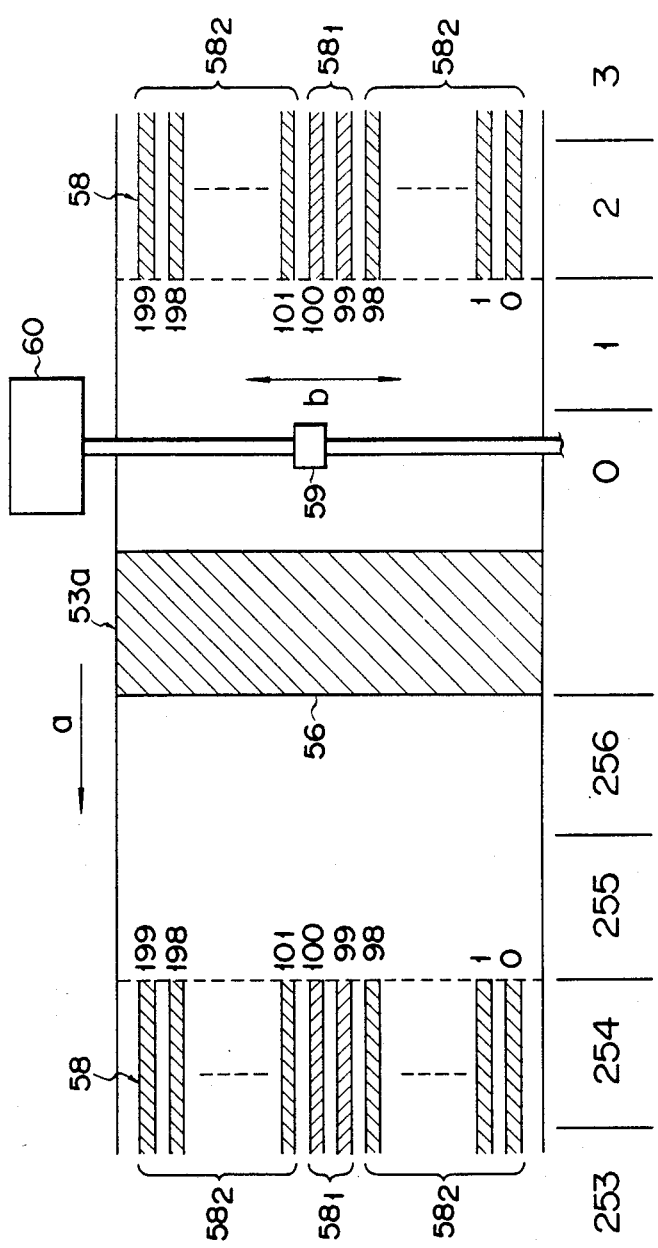
FIG. 4 shows tracks of a magnetic tape.

Used with the aforementioned document information filing system is an endless magnetic tape cassette 50 as shown in FIG. 3. A fixed reel 52 is disposed inside a case 51 of the magnetic tape cassette 50, and a magnetic tape 53 of ½-inch width and 118 feet length is endlessly wound around the outer circumference of the fixed reel 52. When the magnetic tape cassette 50 is set in the LVR 15, the magnetic tape 53 wound around the fixed reel 52 is drawn out from its innermost circumferential portion through a window 52a defined in the fixed reel 52, driven in the direction of an arrow a at a high speed (approx. 16.4 feet/sec) by a capstan 54 and a pinch roller 55, and is wound around the outermost circumferential portion of itself. Thus, the magnetic tape 53 takes a round in approximately 7.2 seconds. As shown in FIG. 4, the tape 53 is provided with a tape mark 56, such as e.g. tin foil, at its joint portion 53a. When the tape mark 56 is optically detected by a mark detector 57, it is confirmed that the tape 53 has taken a round. Namely, the output signal of the mark detector 57 is used as a standard for the detection of the block position (mentioned later) of the tape 53. The tape 53 has 200 parallel recording tracks (approx. 40-μm width 52-μm pitch) 58 extending along the tape running direction a. The recording tracks 58 are successively given track numbers 0, 1, 2, ... 198 and 199 from the bottom one to the top. Among these 200 tracks, two middle tracks with the track numbers 99 and 100 (track "99" is back-up track) are index recording tracks $58_1$ for recording a plurality of specific index information (each consisting of an index code and a recording address which is made up of a track number and a block number) corresponding to a unit of image information, while the remaining 198 tracks (with track numbers 0 to 98 and 101 to 199) are information recording tracks $58_2$ for recording image information. As shown in FIG. 4, each recording track 58 is divided into 256 blocks along the longitudinal direction of the tape 53. These blocks are successively given block numbers 0, 1, 2, ... 254 and 255 with the tape mark 56 as a standard. Reading or writing of information signals for the tape 53 is achieved by reciprocating by microns a recording-reproducing head (magnetic head) 59 in a direction perpendicular to the running direction a by means of a head access device 60, and selecting an optional one of the recording tracks 58.

Figure 5:
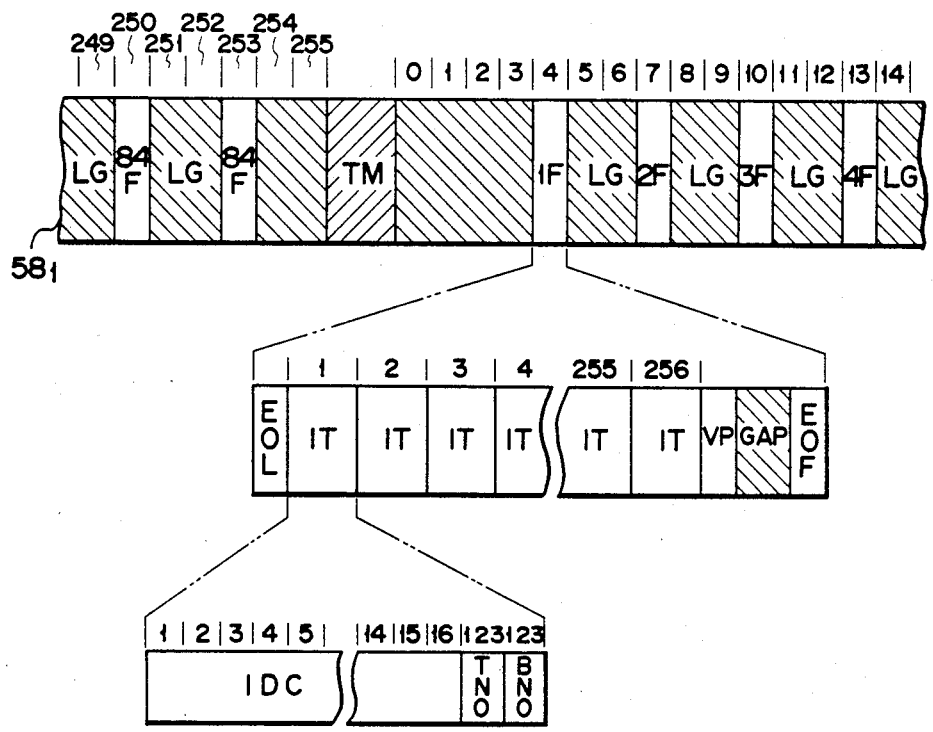
FIG. 5 shows a recording format of an index track of the magnetic tape.
Figure 6:
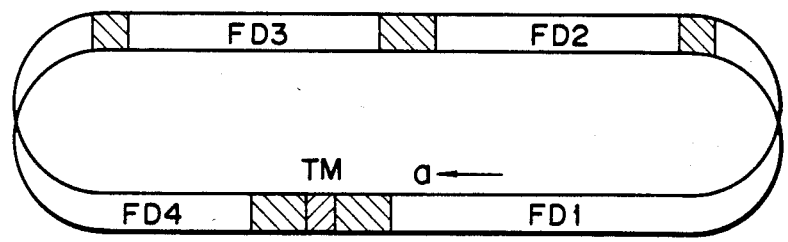
FIG. 6 shows a format of a round index track.

FIG. 5 shows the recording format of one of the index recording tracks $58_1$. Index information are recorded for each three blocks starting at e.g. the fourth block, that is, for the fourth, seventh, tenth, thirteenth, ... blocks, out of the 256 blocks. These marginal blocks are named first (1F), second (2F), third (3F), fourth (4F), ... frames, respectively. Two blocks between each two adjacent frames are ineffective information areas (LG). Each frame contains a frame start code (EOL), first to 256th items (IT), a horizontal parity check code (VP), a recording gap (GAP), and a frame end code (EOF). Further, each item is made up of an index code (IDC) constituted by 16 or fewer digits representing a name or characteristics, a track number (TNO) designating a track on which an image information having such index code name is recorded, and the initial block number (BNO) designating a block in which the image information is recorded. In this embodiment, therefore, 256 index information constitute an index information group or unit, and are recorded within a single frame. The alphanumeric and symbol for the index code constitutes a seven bit code and a 1-bit vertical parity check code, and each of the track and block numbers is made up of a seven bit code and a 1-bit vertical parity check code. In order to reduce the reference time for the index information and to remove the influence of dropout, index information of quite the same contents are repeatedly recorded on the index recording tracks $58_1$. As shown in FIG. 6, for example, equal index information are recorded for each 21 frames; such recording is repeated four times to cover the full length or round of the tape 53. In the case of FIG. 6, equal index information are severally recorded in fields FD1 to FD4. Here the fields FD1, FD2, FD3 and FD4 start at the first, 22nd, 43rd and 64th frames, respectively. These fields FD1 to FD4 are collectively referred to as a file information group including all index information corresponding to image information that can be recorded on a single tape 53.

Operation

When the magnetic tape cassette 50 is set in the cassette holder of the LVR 15 shown in FIG. 1, the magnetic tape 53 of the cassette tape 50 is driven along the direction of the arrow a by the capstan 54 and pinch roller 55, as shown in FIG. 3. At this time, the revolution speed of a motor (not shown) for driving the capstan 54 is detected, and the revolution speed data is transmitted to the CPU 42 through the LVR interface 41. Monitoring the revolution speed of the motor, the CPU 42 gives the LVR 15 a magnetic head drive instruction when the revolution speed reaches a fixed value. In response to the drive instruction, the LVR 15 has its magnetic head 59 (FIG. 3) moved to the index recording track $58_1$. At the same time, the start address of the ID RAM 43b and the number of bytes transferred from the LVR 15 are set in the DMA 44 of the control section 32. In this embodiment, 256×22 bytes are set in the DMA 44. When the magnetic head 59 is located between the fields FD1 and FD2 (FIG. 6) of the index recording track $58_1$, the CPU 42 shifts to DMA mode. As a result, the contents read out from the index recording track $58_1$ of the magnetic tape 53 by the LVR 15, i.e. the contents of the field FD2, are successively stored in the ID RAM 43b by the DMA mode or control by the DMA 44. If no data is read out from the field FD2 due to dropout or the like, then data are read out from the next field FD3. Next, the CPU 42 retrieves from the index information stored in the ID RAM 43b, an item (IT) which has IDC (FIG. 5) indicated by a specific code. The track number (TNO) and block number (BNO) of that item are the numbers of the track and block in which new image information should be recorded. The CPU operates to cause all the frames inclusive of the item to be stored in the back-up ID RAM 43c. Thus, the preparation for storage, retrieval and commencement of reading operation is completed by storing in the ID RAM 43b the frame already made full of two hundred and fifty-six items and by storing in the back-up ID RAM 43c the frame not made full of such items.

First, there will be described the way the image information are stored. In this case, the document 23 bearing the image information is set on a document setting plate 46 shown in FIG. 1. Then, the index code including 16 or fewer digits representing the name and characteristics of the image information of the document 23 is applied to the input of the control section 32 by means of the keyboard 16. When the document information filing system 11 is set to the storage mode by means of the keyboard 16 and a start button is pressed, the document 23 is transferred to a scanning position by the document transfer 22. At this time, the laser oscillator 18 produces a laser beam, which is directed toward the optical scanner 20 by the mirror 19. The optical scanner 20 performs two-dimensional scanning on the document 23 by means of the flip mirror 21. The laser beam reflected by the document 23 is converted into image signals corresponding to the image pattern of the document 23 by an optical sensor 27. The image signals are stored in the line buffer 34 for each scanning line with the aid of the selector 33 shown in FIG. 2. The image information stored in the line buffer 34 are supplied through the selector 35 to the information compressor 36, where they are reduced redundant information by modified Hoffman conversion. The image information reduced redundancy are supplied to the page buffer 38 through the selector 37, and are successively stored in the page buffer 38 for each scanning line. Thus, when the image information for one unit or page are stored in the page buffer 38, the CPU 42 retrieves for a desired item or items represented by the aforesaid specific code among the 256 items (IT) in the index information group or one frame stored in the back-up ID RAM 43c, and causes the RAM 43a to store the track number (TNOS) and block number (BNOS) of the selected item or items. Information given by the numbers TNOS and BNOS represent the recording position or track position of the magnetic tape in which an image information is newly recorded, and a recording start position or block position of the track, respectively. The CPU 42 supplies the LVR 15, through the LVR interface 41, with an instruction to shift the magnetic head 59 in accordance with the track and block numbers stored in the RAM 43a. By such shift instruction, the magnetic head 59 is moved to the aforesaid track position, e.g. track $\overline{\text{TNOS}}$ "50", by a head driver 60. When the magnetic head 59 reaches the track $\overline{\text{TNOS}}$ "50" and a block position, such as e.g. block $\overline{\text{BNOS}}$ "0", of the track reaches the magnetic head 59, the image information stored in the page buffer 38 are read out with every scanning line, and transmitted to the LVR 15 via the selector 37. The LVR 15 causes the track $\overline{\text{TNOS}}$ "50" to store the image information from the block $\overline{\text{BNOS}}$ "0". At this time, if there are already stored image information, a gap for two blocks is provided between the stored image information and image information to be newly stored. When all the image information for one unit or page are stored in the track $\overline{\text{TNOS}}$ "50", the CPU 42 detects the number of the block in which the final image information is stored, and checks to see if such block number is smaller than the final block number 254 of the track. Here the final block number 256 is obtained by means of a block counter in the CPU 42. The block counter is cleared by a detection signal from the mark detector 57 to detect the mark 56 on the tape 53, and counts up in accordance with clock pulses (approx. 28-ms period) produced in synchronism to the travel of the tape 53. The block counter counts from 0 to 255 for each round of the tape 53. When the count value of the block counter is smaller than 254, 3 is added to such count value, and the result $\overline{\text{BNOS}}'$ of the addition, along with the track $\overline{\text{TNOS}}'$ "50", is stored in the IT' next to the IT recording the $\overline{\text{TNOS}}$ and $\overline{\text{BNOS}}$ of the RAM 43c together with the track $\overline{\text{TNOS}}'$ "50" and the specific code. When the count value is equal to 254, the block $\overline{\text{BNOS}}'$ "2", and the track number increased by 1 i.e. the track $\overline{\text{TNOS}}'$ "51" are stored in the RAM 43c. At this time, the recording start address (including a track $\overline{\text{TNOS}}'$ and a block $\overline{\text{BNOS}}'$) of a newly stored image information is stored in the address corresponding to the IT' in the RAM 43c. If all the image information for one page are not stored even though the count value of the block counter is 254, the CPU 42 temporarily suspends the storing operation at the count value 254, and shifts the magnetic head 59 to the adjacent track or track "51" so that the remaining image information may be recorded on the track "51". When all the image information are recorded on the magnetic tape, the succeeding recording start address ($\overline{\text{TNOS}}'$ and $\overline{\text{BNOS}}'$) is stored in the RAM 43a in the same manner as aforesaid. Then, the CPU 42 causes the display device 17 to indicate the recording start address, that is, the track and block numbers. Watching the track and block numbers indicated on the display device 15, an operator can recognize the remaining unused tracks and blocks. Thereafter, in response to the recording start address, the CPU 42 makes the address of the RAM 43c corresponding to the IDC of the IT recording the $\overline{\text{TNOS}}$ and $\overline{\text{BNOS}}$ store the index code initially inputted by means of the keyboard 16, that is, the index code representing the name and characteristics of the recorded image information. Thus, the index information representing the image information for one page, i.e. items IT of FIG. 5, are stored in the RAM 43c. In this situation, in the RAM 43a are already stored the recording start address for the next item, including e.g. track $\overline{\text{TNOS}}'$ "50" and block $\overline{\text{BNOS}}'$ "50". Then, accompanying the aforesaid operation, the next image information from the block "50" of the track "50" is recorded on the magnetic tape 53. Thus, image informations for a plurality of documents are successively stored in the magnetic tape 53, while index information corresponding to these image information are successively stored in the RAM 43c. When the RAM 43c is filled with 256 items, the CPU 42 gives the LVR 15 an instruction to shift the magnetic head 59 to the index track $58_1$. When the magnetic head 59 reaches the index track $58_1$, all the index information stored in the RAM 43c are stored, in the index track $58_1$. If the RAM 43c is not filled with 256 items after the necessary informations for the documents are recorded on the tape 53, when the recording end is set by means of the keyboard 16 (closure processing), the magnetic head 59 is moved to the index track $58_1$, and all the index information stored in the RAM 43c are stored in the index track $58_1$ in the same manner as aforesaid. If the power source is turned off without the closure processing, since the new items are stored in the back-up RAM 43c, the closure processing is carried out at turning-on of the power source.

Now there will be described the way the image information recorded on the magnetic tape 53 are read and printed. In this case, the index code, that is, the track and block numbers corresponding to the desired image information are applied to the input of the control section 32 by means of the keyboard 16, the print mode is established, and the start button is pressed. At this time, the magnetic head 59 is moved to the index track $58_1$, and the index information recorded on the index track $58_1$ are read out similarly to the storing operation of the image information under the control of the CPU 42, and all stored in the RAM 43b. Then, the CPU 42 quickly searches the RAM 43b for the inputted index code among other index information stored in the RAM 43b. When such index code is found out, the track number, such as "10", and block number, such as "50", of the index code are stored in another address of the RAM 43a. Then, the display device 17 indicates that the desired image information is found out. At the same time, the magnetic head 59 is moved to the track "10". When the count value of the block counter counting the number of blocks coincides with the block number stored in the RAM 43a, the CPU 42 gives an instruction for reproducing operation to the LVR 15. Receiving this instruction, the LVR 15 reproduces image information from the block "50". The reproduced signals are stored in the page buffer 38 via the LVR interface 41 and the selector 37. When all the image information for one page are stored in the page buffer 38, the CPU 42 reads out the image information from the page buffer 38 for each scanning line, and supplies them to the signal expander 40. In order to restore the input image information to the original information, the signal expander 40 restores the image information reduced redundancy by modified Hoffman reverse conversion. Image information delivered from the signal expander 40 are stored in the line buffer 34 via the selector 33. The image information in the line buffer 34 are supplied to the printing device 13 as serial image information signals synchronous with the operation timing of the printing device 13. In the printing device 13, the image information signals are supplied to a laser modulator on the output side of the laser oscillator 18 shown in FIG. 1 to modulate the laser beam. The laser beam modulated in accordance with the image information signals scans the photoconductive drum 24 through the mirror 19, optical scanner 20, and flip mirror 21, thereby forming a latent image corresponding to the image information on the photoconductive drum 24. The latent image is developed by the developer 28 and transferred to a copy sheet by the transfer charger 29. The transferred image is fixed by the fixer 25, and outputted as a hard copy. To obtain a hard copy corresponding to some other image information, an index code corresponding to these image information is applied to the input of the control section 32 by means of the keyboard 16, and the start button is pressed. Then, the input index address is searched for among the index addresses stored in the RAM 43b. When the index address is found out, a hard copy is delivered from the printing device 13 after the same operations as aforesaid.

Now there will be described the way the index information are rewritten by the above-mentioned document information filing system. Also in this case, all the index information on the index tracks 58₁ of the magnetic tape 53 are stored in the RAM 43b, the RAM 43b is searched for the index addresses of index information to be rewritten among other index information, and the index information corresponding to the detected index addresses are replaced by new index information inputted through the keyboard 16.

According to this invention, as described above, when a cassette tape is set in the LVR 15, all the information stored in the index track of the cassette tape are read out and stored in a memory in the control section of the document information filing system, an index information corresponding to a desired image information is searched for in accordance with the image information stored in the memory, and the recording or readout of the image information is performed in accordance with the detected index information. Thus, it is unnecessary to search the index track of the cassette tape for the index information with every reference to the image information, so that the index information can securely be decoded without any dropout despite the high-speed tape running. Moreover, since the index information are searched for by the memory in the control section, the reference time is reduced, and the recording and printing turns are greatly increased. The index information corresponding to the current image information being recorded is stored in a nonvolatile RAM and recorded in the LVR by the closure processing, so that no index information are lost due to a misoperation and power failure.

Although the recorder employing the magnetic tape is used in the above embodiment, there may also be used a recorder which utilizes a magnetic disc or optical disc. In the above-mentioned embodiment, moreover, the recording or reproduction of the information is achieved by moving a single magnetic head to a predetermined track. Alternatively, however, the information may be recorded or reproduced on or from a given track by electrically selecting one among a multitude of magnetic heads. According to the invention, moreover, even though the index information are recorded irregularly on the index track, the reference may be performed considerably easily by regularly storing the index information in the RAM of the control section.

What is claimed is:

1. A document information filing system comprising:
   a keyboard for user designating index information identifying document information to be stored in said filing system or information previously stored therein to be retrieved, said index information including address data and an index code representing a characteristic of said document information;
   a recorder including
      means adapted to receive an information recording medium having at least one first recording track for storing a plurality of such index informations related to separate document informations and a plurality of second recording tracks for storing document image information corresponding to each index information, and
      means for reading the index information from said first recording track;
   index memory means for storing all of the index information read from said first recording track; and
   control means, connected to said keyboard, said recorder and said index memory means, for receiving user designated index information from said keyboard, for locating the index information specified by said keyboard among all the index information previously read from said first recording track and stored in said index memory means and for driving said reproducing means to reproduce the image information stored in at least a portion of one of the second tracks of said information recording medium corresponding to the address data retrieved from said index memory means.

2. A document information filing system according to claim 1, wherein said control means includes an information compressor for reducing redundancy of the image information from said scanner, a page buffer for storing the reduced redundancy image information from said information compressor for each page of the document, means for transferring the image information stored in said page buffer to said recorder, means for transferring the reproduced image information from said recorder to said page buffer, thereby causing said page buffer to store said reproduced image information, an information expander for restoring the reproduced image information stored in said page buffer, and means for transferring the expanded image information from said information expander.

3. A document information filing system according to claim 1, wherein said index memory means comprises a random access memory (RAM).

4. A document information filing system according to claim 1, wherein said recorder is a magnetic tape recorder having at least one magnetic head which records information on and reproduces information from the first and second tracks of said magnetic tape.

5. A document information filing system according to claim 1, further including a printing device for reproducing a hard copy from the image information delivered from said reproducing means.

6. A document information filing system according to claim 5, wherein said printing device comprises a copying device including means for forming an optical image corresponding to the image information supplied to said printing device, a photoconductive member exposed by said optical image to form a latent image thereon, means for developing said latent image on said photoconductive member, and means for transferring and fixing an image developed by said developing means to a copy sheet.

7. A document information filing system according to claim 1 further including a scanner for optically scanning a document and generating image information of the documents and wherein said index memory means comprises means for storing index information newly supplied by said keyboard and being newly recorded on said first recording track, and wherein said recorder includes means for recording the image information generated by said scanner on at least one of the second tracks designated by the newly supplied index information from said keyboard.

8. A document information filing system according to claim 1, wherein said recorder includes means for sequentially transferring the index information to said index memory means.

* * * * *